US010550785B2

(12) United States Patent
Kawakami et al.

(10) Patent No.: US 10,550,785 B2
(45) Date of Patent: Feb. 4, 2020

(54) VEHICLE CONTROL DEVICE AND VEHICLE CONTROL METHOD

(71) Applicant: Hitachi Automotive Systems, Ltd., Hitachinaka-shi, Ibaraki (JP)

(72) Inventors: Tomonori Kawakami, Ibaraki (JP); Yuto Imanishi, Tokyo (JP); Takeo Shibata, Ibaraki (JP)

(73) Assignee: Hitachi Automotive Systems, Ltd., Hitachinaka-shi (JP)

( * ) Notice: Subject to any disclaimer, the term of this patent is extended or adjusted under 35 U.S.C. 154(b) by 0 days.

(21) Appl. No.: 15/501,763

(22) PCT Filed: Jul. 1, 2015

(86) PCT No.: PCT/JP2015/068938
§ 371 (c)(1),
(2) Date: Feb. 3, 2017

(87) PCT Pub. No.: WO2016/042882
PCT Pub. Date: Mar. 24, 2016

(65) Prior Publication Data
US 2017/0226947 A1    Aug. 10, 2017

(30) Foreign Application Priority Data

Sep. 19, 2014 (JP) ................................. 2014-191566

(51) Int. Cl.
*F02D 41/08* (2006.01)
*B60W 50/14* (2012.01)
(Continued)

(52) U.S. Cl.
CPC ............. *F02D 41/08* (2013.01); *B60W 10/06* (2013.01); *B60W 30/16* (2013.01);
(Continued)

(58) Field of Classification Search
CPC ............. B60W 10/06; B60W 2520/10; B60W 2540/10; B60W 2540/12; B60W 2550/12;
(Continued)

(56) References Cited

U.S. PATENT DOCUMENTS

2003/0087724 A1    5/2003 Seibertz et al.
2013/0173113 A1    7/2013 Takiguchi et al.
(Continued)

FOREIGN PATENT DOCUMENTS

DE    10 2012 013 689 A1    1/2014
EP    2 620 344 A1    7/2013
(Continued)

OTHER PUBLICATIONS

International Search Report (PCT/ISA/210) issued in PCT Application No. PCT/JP2015/068938 dated Oct. 6, 2015 with English translation (six pages).
(Continued)

*Primary Examiner* — Grant Moubry
*Assistant Examiner* — Ruben Picon-Feliciano
(74) *Attorney, Agent, or Firm* — Crowell & Moring LLP

(57) ABSTRACT

Provided is a vehicle control device with which improved fuel economy and lowered exhaust gas emissions can be effectively achieved without adversely affecting the driver when traveling while following a leading vehicle. The present invention has: a following-determination means that, during travel while following a leading vehicle, determines, on the basis of the speed of the host vehicle, the speed of the leading vehicle, and the distance from the leading vehicle, whether the host vehicle will be able to follow the leading vehicle by coasting; and an idle stop determination means that, when the following-determination means has determined that the host vehicle will be able to follow the leading vehicle by coasting, and the driving/travel state of the host
(Continued)

vehicle satisfies other traveling idle stop criteria, determines that a traveling idle stop should be performed; and is provided with a determination criteria updating means for updating the determination criteria for the idle stop determination means in regard to criteria such as the leading vehicle characteristics, road surface conditions, and weather. In the event that it has been determined, from the determination conditions that have been updated in regard to the leading vehicle characteristics, etc., that following by coasting is possible, a control to shut off the on-board engine is performed.

10 Claims, 9 Drawing Sheets

(51) Int. Cl.
| | | |
|---|---|---|
| *B60W 30/16* | (2012.01) | |
| *F02D 29/02* | (2006.01) | |
| *B60W 50/00* | (2006.01) | |
| *B60W 10/06* | (2006.01) | |
| *B60W 30/18* | (2012.01) | |
| *F02N 11/00* | (2006.01) | |
| *F02N 11/08* | (2006.01) | |
| *F02P 5/15* | (2006.01) | |
| *F02N 5/04* | (2006.01) | |
| *F02P 3/045* | (2006.01) | |
| *F02P 5/152* | (2006.01) | |

(52) U.S. Cl.
CPC .. *B60W 30/18072* (2013.01); *B60W 50/0097* (2013.01); *B60W 50/14* (2013.01); *F02D 29/02* (2013.01); *F02N 11/00* (2013.01); *F02N 11/0837* (2013.01); *F02P 5/1516* (2013.01); B60W 2520/10 (2013.01); B60W 2540/10 (2013.01); B60W 2540/12 (2013.01); B60W 2550/12 (2013.01); B60W 2550/142 (2013.01); B60W 2550/148 (2013.01); B60W 2550/302 (2013.01); B60W 2550/308 (2013.01); B60Y 2300/18083 (2013.01); B60Y 2300/192 (2013.01); B60Y 2300/436 (2013.01); F02D 2200/501 (2013.01); F02D 2200/602 (2013.01); F02N 5/04 (2013.01); F02N 2200/046 (2013.01); F02N 2200/101 (2013.01); F02N 2200/102 (2013.01); F02N 2200/125 (2013.01); F02N 2300/306 (2013.01); F02P 3/045 (2013.01); F02P 5/1522 (2013.01); Y02T 10/46 (2013.01); Y02T 10/48 (2013.01); Y02T 10/76 (2013.01)

(58) Field of Classification Search
CPC ..... B60W 2550/142; B60W 2550/148; B60W 2550/302; B60W 2550/308; B60W 30/16; B60W 30/18072; B60W 50/0097; B60W 50/14; B60Y 2300/18083; B60Y 2300/192; B60Y 2300/436; F02D 2200/501; F02D 2200/602; F02D 29/02; F02D 41/08; F02N 11/00; F02N 11/0837; F02N 2200/046; F02N 2200/101; F02N 2200/102; F02N 2200/125; F02N 2300/306; F02N 5/04; F02P 3/045; F02P 5/1516; F02P 5/1522; Y02T 10/46; Y02T 10/48; Y02T 10/76
See application file for complete search history.

(56) References Cited

U.S. PATENT DOCUMENTS

| | | |
|---|---|---|
| 2013/0211689 A1 | 8/2013 | Mizutani et al. |
| 2014/0156171 A1 | 6/2014 | Kono et al. |
| 2015/0142287 A1 | 5/2015 | Dornieden et al. |
| 2017/0001640 A1* | 1/2017 | Asakura ............... B60W 30/16 |
| 2017/0243485 A1* | 8/2017 | Rubin ................. H04W 72/005 |

FOREIGN PATENT DOCUMENTS

| | | |
|---|---|---|
| EP | 2 738 412 A1 | 6/2014 |
| JP | 2010-30430 A | 2/2010 |
| JP | 2010-143304 A | 7/2010 |
| JP | 2012-127265 A | 7/2012 |
| JP | 2013-68178 A | 4/2013 |
| JP | 2015-143490 A | 8/2015 |
| WO | WO 2013/147682 A1 | 10/2013 |
| WO | WO 2015/118570 A1 | 8/2015 |

OTHER PUBLICATIONS

Japanese-language Written Opinion (PCT/ISA/237) issued in PCT Application No. PCT/JP2015/068938 dated Oct. 6, 2015 with English translation (10 pages).
Extended European Search Report issued in counterpart European Application No. 15842044.8 dated Jun. 18, 2018 (nine (9) pages).
Corresponding European Office Action dated Nov. 7, 2019 (7 pages).

* cited by examiner

VEHICLE CONTROL DEVICE AND VEHICLE CONTROL METHOD

TECHNICAL FIELD

The present invention relates to a vehicle control device and a vehicle control method for performing traveling idle stop control for temporarily stopping an in-vehicle engine when a driving/travel state of a host vehicle satisfies a predetermined condition while following a leading vehicle.

BACKGROUND ART

Recently, in the field of vehicle control, for the purpose of improving fuel economy and reducing exhaust gas, idle stop control for temporarily stopping an engine when a vehicle is parked or waiting for a traffic light and thereafter for restarting the engine when an accelerator pedal is pressed has been widely used as disclosed in PTL 1.

In addition, control for temporarily stopping an engine and restarting it thereafter (hereinafter referred to as traveling idle stop control) while traveling has also been known.

In the known traveling idle stop control, normally, an engine is stopped when a driver presses a brake pedal and the speed of the host vehicle becomes slower than the predetermined speed (low speed) and the engine is restarted when the driver releases the brake pedal.

Note that, PTL 2 discloses control for temporarily stopping an engine when a driving/travel state of a vehicle satisfies a predetermined condition while traveling and restarting the engine with the use of kinetic energy of the vehicle when the condition is no longer satisfied.

CITATION LIST

Patent Literature

PTL 1: JP 2010-30430 A
PTL 2: JP 2012-127265 A

SUMMARY OF INVENTION

Technical Problem

In the known traveling idle stop control, the timing of stop and restart of an engine depends on brake pedal operation of a driver even if there is a leading vehicle in front of the host vehicle.

Since the host vehicle has faster speed than necessary when a driver excessively presses an accelerator pedal for example, if it depends on brake pedal operation of the driver, speed is to be adjusted by brake pedal operation. Acceleration equivalent to energy lost by this brake pedal operation will be waste.

In addition, the engine becomes an idle state when the brake pedal is released. This causes delay in acceleration of the host vehicle for a period equivalent to a period necessary for restarting the engine if the engine is restarted by the driver's pressing of the accelerator pedal in a traveling idle stop (engine stop) state.

In order to prevent this, the engine needs to be started in advance when there is a possibility that the driver presses the accelerator pedal. However, fuel is consumed more than necessary because the idle state continues if the period until the driver's pressing of the accelerator pedal becomes long.

Moreover, in the known traveling idle stop control, the engine can be stopped only when the host vehicle is traveling at low speed and the engine is not stopped when it is traveling at high speed. This is because delay time required to start the engine (time required to obtain a state in which a transmission is connected and power is transmitted without causing a shock) is too large to be compensated by a shift time from the driver's brake pedal operation to accelerator pedal operation while traveling at high speed.

The present invention has been developed in consideration of the circumstances described above, and the object of the present invention is to provide a vehicle control device and a vehicle control method that can prevent consumption of energy as much as possible without decreasing operability of a vehicle while following a leading vehicle to effectively improve fuel economy and reduce exhaust gas without causing sense of uncomfortability to a driver, especially, that can detect traveling characteristics of the leading vehicle, a road surface condition, weather, and the like to further improve fuel economy and reduce exhaust gas.

Solution to Problem

In order to achieve the object, a vehicle control device according to the present invention is a vehicle control device that performs traveling idle stop for temporarily stopping an in-vehicle engine when a driving/travel state of a host vehicle satisfies a predetermined condition while following a leading vehicle, and the vehicle control device includes: a following determination unit that determines whether or not the host vehicle is able to follow the leading vehicle by inertia traveling on the basis of speed of the host vehicle, speed of the leading vehicle, and distance between the host vehicle and the leading vehicle; an idle stop determination unit that determines whether or not to perform the traveling idle stop if the driving/travel state of the host vehicle satisfies another traveling idle stop condition and the following determination unit determines that the host vehicle is able to follow the leading vehicle by inertia traveling; and a determination condition update unit that updates a determination condition of the idle stop determination unit on the basis of a condition such as characteristic of the leading vehicle, road surface condition, and weather.

In a vehicle control device of the present invention with a configuration described above, since whether or not to perform traveling idle stop on the basis of a determination condition updated by conditions of leading vehicle characteristics such as speed and vehicle type information of a leading vehicle, a road surface condition, and weather, and traveling idle stop is controlled in accordance with the characteristics of the leading vehicle, the road surface condition, the weather, and the like, it is possible for a vehicle to travel with low fuel consumption with less uncomfortability to the driver.

Advantageous Effects of Invention

In the vehicle control device according to the present invention, whether or not to perform idle stop is determined by a determination condition updated by leading vehicle characteristics or the like even if a driver releases a brake pedal for example, during traveling idle stop (engine stop), and an engine can be kept stopped when the host vehicle inertially keeps following a leading vehicle. In addition, since the engine can be restarted if the host vehicle cannot inertially follow the leading vehicle while the engine is stopped, the driver can restart the engine in advance before pressing an accelerator pedal. As a result, it is possible to effectively improve fuel economy and reduce exhaust gas without causing sense of uncomfortability to the driver. The problems, configurations, and advantageous effects other than those described above will be apparent in the embodiments described below.

DESCRIPTION OF EMBODIMENTS

An embodiment of a vehicle control device according to the present invention will be described below with reference to the drawings.

Figure 1:
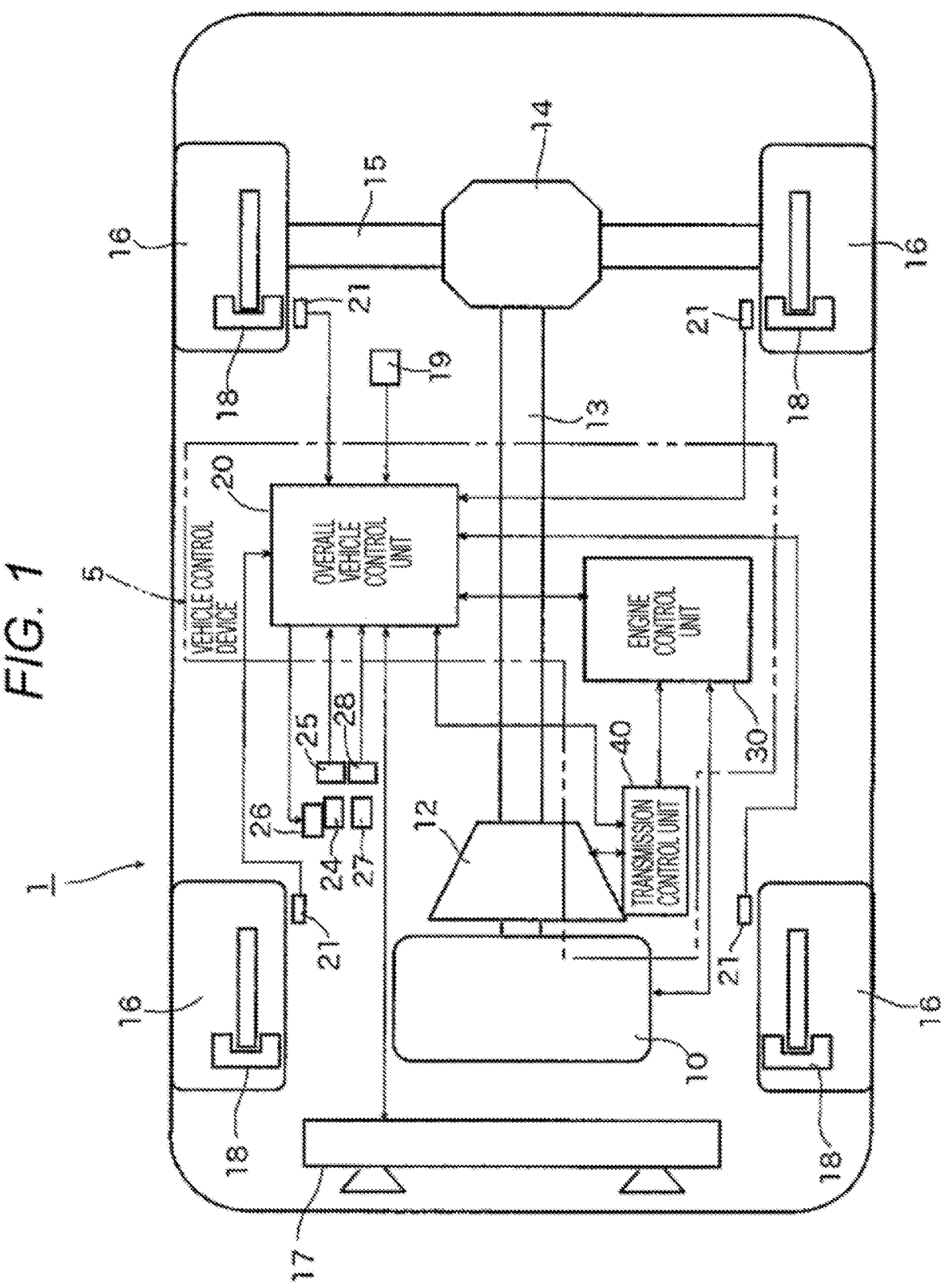
FIG. 1 is a schematic configuration diagram illustrating one embodiment of a vehicle control device according to the present invention together with a vehicle to which such a vehicle control device is applied.
Figure 2:
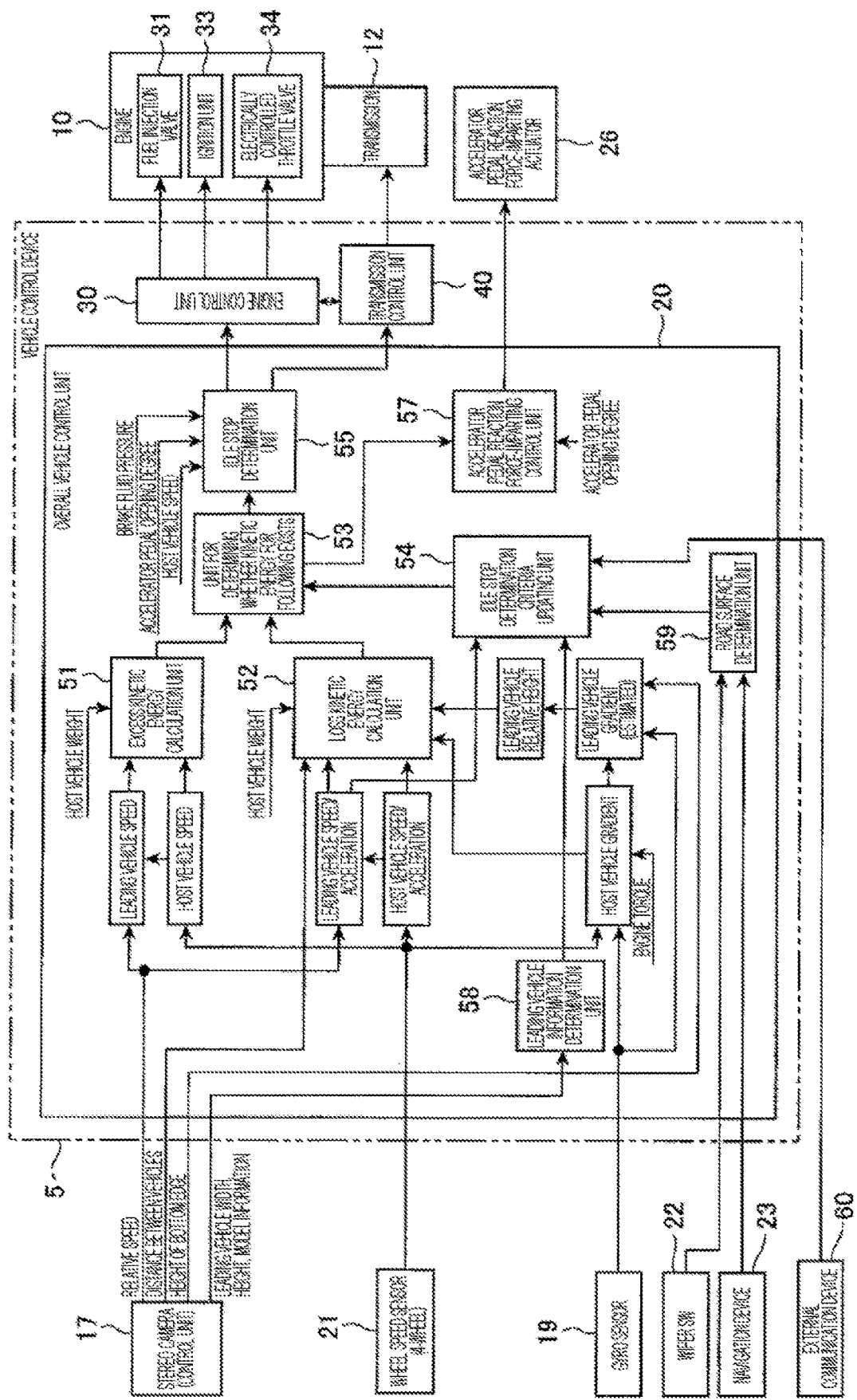
FIG. 2 is a functional block diagram illustrating a main part of the vehicle control device illustrated in FIG. 1.

FIG. 1 is a schematic configuration diagram illustrating an embodiment of a vehicle control device according to the present invention together with a vehicle to which such a vehicle control device is applied, and FIG. 2 is a functional block diagram illustrating a main part of the vehicle control device illustrated in FIG. 1.

An illustrated vehicle 1 is a rear drive vehicle with a general configuration that includes, for example, an in-cylinder injection gasoline engine 10 as a traveling power source, an automatic transmission 12 that can get closer to and away from the engine 10, a propeller shaft 13, a differential gear 14, a drive shaft 15, four wheels 16, and a hydraulic brake 18.

Control units incorporating microcomputers such as an overall vehicle control unit 20 that forms a main part of a vehicle control device 5 of the present invention which controls devices, actuators, and instruments included in the vehicle 1, an engine control unit 30 for controlling an engine, and a transmission control unit 40 for controlling a transmission are provided at predetermined positions of the vehicle 1.

Each control unit, devices including sensors described later, actuators, and instruments can receive and transmit signal/data via in-vehicle LAN (CAN). The vehicle control device 5 according to the present invention performs traveling idle stop for temporarily stopping an in-vehicle engine when a driving/travel state of a host vehicle satisfies a predetermined condition when it is following a leading vehicle.

A stereo camera 17 is provided in the front of the vehicle 1. The stereo camera 17 includes a control unit incorporating a microcomputer, and the control unit calculates the speed of the host vehicle relative to the speed of a leading vehicle, distance between a leading vehicle, an obstacle, an oncoming vehicle, and the like in front of the host vehicle and the host vehicle (for example, distance between vehicles), the height from the road surface to the bottom edge of a leading vehicle, and the like on the basis of a captured video image, and transmits them to an overall vehicle control unit 20. In addition, the stereo camera 17 supplies the width, the height, the vehicle type information, or the like of the leading vehicle to a leading vehicle information determination unit 58 described later and to an idle stop determination criteria updating unit 54 described later in the overall vehicle control unit 20.

Signals from four vehicle speed sensors 21 for detecting rotating speed of each wheel 16, an accelerator pedal sensor 25 for detecting an opening degree (amount of pressing) of an accelerator pedal 24, a brake sensor 28 for detecting amount of pressing of a brake pedal 27, a gyro sensor 19 for detecting gradient of the host vehicle, and the like are also supplied to the overall vehicle control unit 20. In addition, a signal of an operation switch (hereinafter referred to as wiper SW) 22 of a wiper device as well as road surface information from a navigation device 23 are also supplied to the overall vehicle control unit 20. Rain information is output from the wiper SW 22 of the wiper device and supplied to a road surface determination unit 59 described later, and condition of the road surface such as curve and relief is supplied from the navigation device 23 to the road surface determination unit 59.

Information of an external communication device 60 is supplied to the overall vehicle control unit 20. For example, weather information of road information on an express way and radio as well as various information from road information and traffic information of a police station are input to the external communication device 60. These pieces of information, the information from the wiper SW 22, and the information from the navigation device 23 are supplied to the idle stop determination criteria updating unit 54 in the overall vehicle control unit 20, updated to a predetermined gain α and supplied to the unit for determining whether kinetic energy for following exists 53. This gain is for correcting loss kinetic energy of the host vehicle calculated by the loss kinetic energy calculation unit 52.

Note that, the vehicle 1 illustrated in the figure is an example of a vehicle to which the present invention can be applied and does not limit a configuration of a vehicle to which the present invention can be applied. For example, a vehicle with continuously variable transmission (CVT) instead of the automatic transmission 12 is also possible, and the relative speed, the distance between vehicles, and the like may be calculated with the use of one of or combination of a laser radar, a millimeter-wave radar, a monocular camera, and like as an environment recognition sensor instead of the stereo camera 17.

In addition, the amount of pressing of the brake pedal 27 is also detected by a hydraulic pressure sensor (not illustrated) for detecting brake fluid pressure of a control system of the brake 18 in addition to the brake sensor 28.

Signal/data from the control units such as the overall vehicle control unit 20 and the transmission control unit 40 as well as various signals that represent or that are basis for calculating a driving state (the number of rotations of engine, amount of inhaled air, throttle opening degree, in-cylinder pressure, and the like) of the engine 10 from the sensors provided to the engine 10 are supplied to the engine control unit 30, and the engine control unit 30 supplies a predetermined control signal to a fuel injection valve 31, an ignition unit 33 including an ignition coil and an ignition plug, an electrically controlled throttle valve 34, and the like on the basis of these signals as illustrated in FIG. 2 described later, and controls fuel injection (amount), ignition (timing), throttle opening degree, and the like.

In addition to the configuration described above, a reaction force actuator 26 for applying an operational reaction force to the accelerator pedal 24 in addition to an ordinary restoring force is provided to the vehicle 1 according to the present embodiment. A control signal is supplied to the actuator 26 from the overall vehicle control unit 20.

Here, while following a leading vehicle, the vehicle control device 5 according to the embodiment of the present invention estimates kinetic energy necessary for the host vehicle in the future on the basis of the kinetic energy of the host vehicle, the speed of the leading vehicle, and the distance between the host vehicle and the leading vehicle, determines whether or not there is sufficient kinetic energy (kinetic energy for following) necessary for the host vehicle to follow the leading vehicle by inertia traveling on the basis of the estimated kinetic energy and the present kinetic energy, and performs traveling idle stop for temporarily stopping the engine when it is determined that there is sufficient kinetic energy for following and the driving/travel state of the host vehicle satisfies other traveling idle stop conditions. The conditions for determining whether or not it is possible to follow the leading vehicle by inertia traveling can be updated by the history of the speed of the leading vehicle, information on the leading one such as width, height, and vehicle type information of the leading vehicle, and the road surface determination condition such as road surface information and rain information.

Next, determination of whether or not there is sufficient kinetic energy for following will be described with reference to FIGS. 3(A) to 4(B).

Figure 3A:
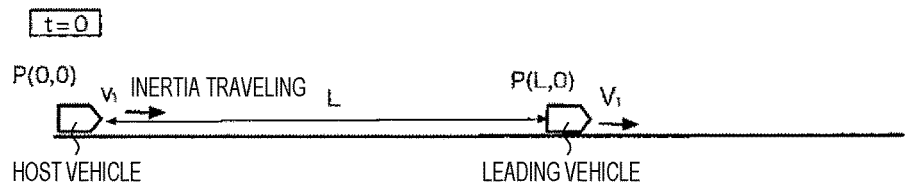
FIGS. 3A and 3B illustrate a relationship between a host vehicle and a leading vehicle when the host vehicle is following the leading vehicle.
Figure 3B:
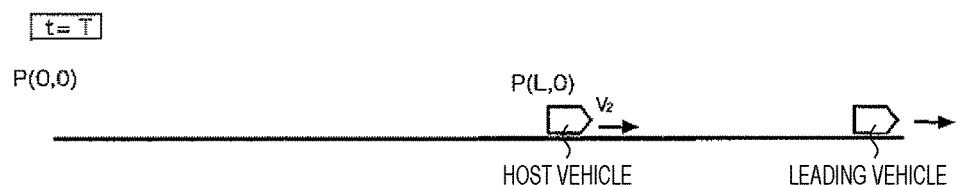

FIGS. 3(A) and 3(B) illustrate a state in which the host vehicle and the leading vehicle are traveling on a flat road. FIG. 3(A) illustrates a relationship between the host vehicle and the leading vehicle when time t=0, and FIG. 3(B) illustrates an estimation as to when the host vehicle reaches the coordinate P (L, 0) from time t=0 and the coordinate P (0, 0) with inertia driving, and the time in such a case is t=T (second). In FIGS. 3(A) and 3(B) (and FIGS. 4(A) and 4(B) described later), $v_1$ represents the present host vehicle speed, $V_1$ represents the present leading vehicle speed, L represents the present distance between the vehicles, and $v_2$ represents the speed of the host vehicle after T seconds.

Note that, as illustrated in FIG. 2, the speed of the host vehicle is calculated on the basis of a signal and the like from the four vehicle speed sensors 21, and the speed of the leading vehicle is calculated on the basis of the speed of the host vehicle and the relative speed obtained from the stereo camera 17.

It is apparent from FIGS. 3(A) and 3(B) that the relationship of the following formula (1) needs to be satisfied in order for the host vehicle to follow the leading vehicle by inertia traveling.

$$v_2 > V_1 \quad \text{[Formula 1]}$$

When m is the weight of the host vehicle and A is the predicted deceleration speed, the following formula (2) can be obtained from the formula (1).

Note that, the weight m of the host vehicle is calculated as weight obtained by adding load capacity of the present driving to the fixed value by internal processing, and the predicted deceleration speed A can be calculated on the basis of the change rate of the speed of the host vehicle as it is inertially traveling, and it can be represented as 0.1 [G], for example.

[Formula 2]

$$\frac{1}{2}mv_1^2 - \frac{1}{2}mV_1^2 > \alpha mAL \quad (2)$$

The first term of the left member of the formula (2) represents the present kinetic energy of the host vehicle and the second term of the left member represents kinetic energy necessary at a minimum when the host vehicle passes the coordinate P (L, 0), which is the present position of the leading vehicle. In other words, the second term of the left member is predicted kinetic energy on the assumption that the host vehicle travels at the speed of the leading vehicle. Therefore, the left member represents excess kinetic energy that is a difference between the kinetic energy of the host vehicle and the kinetic energy on the assumption that the host vehicle travels at the speed of the leading vehicle.

In addition, the right member of the formula (2) represents loss kinetic energy of the host vehicle when the vehicle 1 inertially travels with the engine stopped from the coordinate P (0, 0), which is the present position, to the coordinate P (L, 0), which is the present position of the leading vehicle. α is a gain of the loss kinetic energy and normally "1." In the vehicle control device 5 according to the present embodiment, the gain α is updated by conditions such as characteristics of the leading vehicle that travels in front of the host vehicle, road surface condition, and weather, and corrects the loss kinetic energy of the host vehicle.

Therefore, the formula (2) shows a relationship in which the excess kinetic energy of the host vehicle is larger than the loss kinetic energy, and it is possible to say that there is sufficient kinetic energy for following and the host vehicle can pass the coordinate P (L, 0) at the speed $V_1$ or faster by inertia traveling if the formula (2) is satisfied.

Figure 4A:
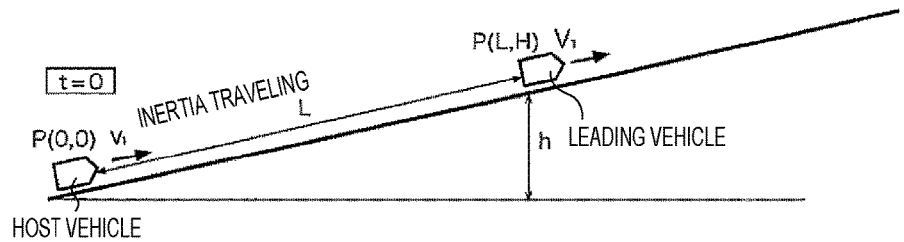
FIGS. 4A and 4B illustrate a relationship between a host vehicle and a leading vehicle when the host vehicle is following the leading vehicle on a slope.
Figure 4B:
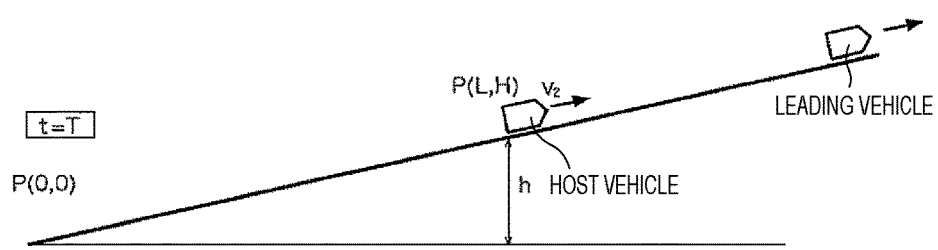

On the other hand, as FIGS. 4(A) and 4(B) illustrate a state in which the host vehicle is traveling on an ascending slope, the formula (1) can also be represented as a relationship formula as the formula (3) if travel resistance and gradient are taken into consideration.

Note that, in FIGS. 4(A) and 4(B), h represents relative height of the leading vehicle. The relative height h of the leading vehicle is calculated on the basis of the gradient of the leading vehicle and the distance between vehicles L. As illustrated in FIG. 2, the gradient of the leading vehicle is calculated (estimated) on the basis of, for example, the speed and engine torque of the host vehicle, the height of the bottom edge of the leading vehicle obtained from the stereo camera 17, the gradient of the host vehicle obtained from a gyro sensor 19, and the like.

In addition, in the formula (3), a(t) represents the travel resistance at the time t, v(t) represents the speed of the host vehicle at the time t, and g represents gravity acceleration.

[Formula 3]

$$\frac{1}{2}mv_1^2 - \frac{1}{2}mV_1^2 > \alpha\left(m\int_0^T a(t)v(t)dt + mgh\right) \quad (3)$$

As with the formula (2), the left member of the formula (3) represents the present kinetic energy of the host vehicle, and the second term of the left member is kinetic energy necessary at a minimum when the host vehicle passes the coordinate P (L, H), which is the present position of the leading vehicle. In other words, the second term of the left member is predicted kinetic energy on the assumption that the host vehicle travels at the speed of the leading vehicle. Therefore, the left member represents excess kinetic energy that is a difference between the kinetic energy of the host vehicle and the kinetic energy on the assumption that the host vehicle travels at the speed of the leading vehicle.

In addition, the first term of the right member represents kinetic energy lost by travel resistance when the host vehicle inertially travels from the coordinate P (0, 0) to the coordinate P (L, H) with the engine stopped, and corresponds to the right member of the formula (2). The second term of the right member represents relative positional energy of the coordinate P (L, H). That is, the right member of the formula (3) represents loss kinetic energy necessary for the host vehicle to reach the coordinate P (L, H) from the coordinate P (0, 0).

Therefore, the formula (3) represents a relationship in which the excess kinetic energy of the host vehicle is larger than the loss kinetic energy, and it is possible to say that there is sufficient kinetic energy for following and the host vehicle can pass the coordinate P (L, H) at the speed $V_1$ or faster with inertia traveling if the formula (3) is satisfied.

Next, leading vehicle following traveling idle stop control performed by the vehicle control device 5 according to the present embodiment will be described in detail.

The vehicle control device 5 according to the present embodiment includes the overall vehicle control unit 20 as a main part. As illustrated in the functional block diagram of FIG. 2, the overall vehicle control unit 20 includes an excess kinetic energy calculation unit 51, a loss kinetic energy calculation unit 52, a unit for determining whether kinetic energy for following exists 53 as a following determination unit, the idle stop determination criteria updating unit 54, an idle stop determination unit 55, and an accelerator pedal reaction force-imparting control unit 57.

The excess kinetic energy calculation unit 51 calculates excess kinetic energy that is a difference between the kinetic energy of the host vehicle and the predicted kinetic energy of the host vehicle on the assumption that the host vehicle travels at the speed V of the leading vehicle on the basis of the weight m of the host vehicle and the speed v of the host vehicle.

The loss kinetic energy calculation unit 52 calculates loss kinetic energy of the host vehicle on the basis of the weight m of the host vehicle, the predicted deceleration speed A or the travel resistance of the host vehicle, the distance L to the leading vehicle, and the relative height h of the leading vehicle.

The idle stop determination criteria updating unit 54 updates a gain α for correcting the loss kinetic energy calculated by the loss kinetic energy calculation unit 52, and information on the leading vehicle such as the width, the height, and the vehicle type information of the leading vehicle obtained from the stereo camera 17 as well as the road surface condition from the wiper SW 22 and the navigation device 23 and the speed/acceleration of the leading vehicle are supplied to the idle stop determination criteria updating unit 54. Then, for example, frequency of acceleration and deceleration of the leading vehicle is obtained with the history of the speed of the leading vehicle, and the gain α of the loss kinetic energy of the formulae (2) and (3) is updated to the predetermined value from the preset value when the it exceeds the predetermined frequency (threshold value) within the predetermined time period or by the conditions such as the width, the height, and the vehicle type information of the leading vehicle, and the weather. In addition, the idle stop determination criteria updating unit 54 updates the determination condition if the vehicle type detected by the stereo camera 17 matches the registered one.

The unit for determining whether kinetic energy for following exists 53 determines whether or not there is sufficient kinetic energy (kinetic energy for following) necessary for the host vehicle to follow the leading vehicle by inertia traveling on the basis of the excess kinetic energy, the loss kinetic energy, and the gain α updated by the idle stop determination criteria updating unit 54. Here, it is determined that there is sufficient kinetic energy for following if the excess kinetic energy is larger than the loss kinetic energy corrected by the gain α and it is determined that kinetic energy for following is insufficient if the excess kinetic energy is smaller than the loss kinetic energy corrected by the gain α.

The idle stop determination unit 55:
(a) outputs an instruction to stop the engine to an engine control unit 30 if it is determined that there is sufficient kinetic energy for following and the driving/travel state of the host vehicle satisfies other idle stop conditions (for example, the accelerator pedal 24 is not pressed);
(b) outputs an instruction to restart the engine to the engine control unit 30 if it is determined that kinetic energy for following is insufficient (not enough) during idle stop (while engine is stopped);
(c) outputs an instruction to restart the engine to the engine control unit 30 if pressing of the accelerator pedal 24 is detected while the engine is stopped;
(d) outputs an instruction to stop the engine to the engine control unit 30 even if it is determined that kinetic energy for following is insufficient (not enough) while pressing of the brake pedal 27 is being detected when the host vehicle is traveling at low speed; and
(e) outputs an instruction to stop the engine to the engine control unit 30 as long as other idle stop conditions (for example, the accelerator pedal 24 is not pressed) are satisfied regardless of whether the brake pedal is pressed or not if it is determined that there is sufficient kinetic energy for following when the host vehicle is traveling at high speed.

When it is determined that there is sufficient kinetic energy for following, the accelerator pedal reaction force-imparting control unit 57 activates the accelerator pedal reaction force-imparting actuator 26 to apply an operational reaction force to the accelerator pedal 24 in addition to an ordinary restoring force, and when it is determined that kinetic energy for following is insufficient, and when the accelerator pedal 24 is pressed more or continuously pressed for the predetermined period or more even though the operational reaction force has been continuously applied, the accelerator pedal reaction force-imparting control unit 57 cancels application of the operational reaction force by the reaction force-imparting actuator 26.

The operation to apply the operational reaction force to the accelerator pedal 24 is performed to encourage the driver to release the accelerator pedal 24 and inertially drive by applying a reaction force to the accelerator pedal 24. In addition, when the accelerator pedal 24 is pressed more or continuously pressed for the predetermined period or more even though the operational reaction force has been continuously applied, the intention of the driver is respected and application of the operational reaction force by the reaction force-imparting actuator 26 is canceled. Note that, in case of a vehicle in which a reaction force cannot be applied to the accelerator pedal 24, it may be possible to tell the driver to release the accelerator pedal by buzzer, monitor display, or the like.

When the engine control unit 30 receives an instruction to stop the engine from the idle stop determination unit 55, the engine control unit 30 stops supplying a fuel injection (driving) pulse signal to the fuel injection valve 31 and stops supplying an ignition signal to the ignition unit 33. Then control of the electrically controlled throttle valve 34 is reset. Accordingly, the engine is stopped.

In addition, when the engine control unit 30 receives an instruction to restart the engine from the idle stop determination unit 55, the engine control unit 30 restarts supplying a fuel injection (driving) pulse signal to the fuel injection valve 31, restarts supplying an ignition signal to the ignition unit 33, and controls the electrically controlled throttle valve 34. Accordingly, the engine is restarted.

Moreover, when the idle stop determination unit 55 outputs an instruction to stop the engine to the engine control unit 30, it outputs an instruction to shut off the engine to a transmission control unit 40 at the same time, and when it outputs an instruction to restart the engine, it outputs an instruction to connect the engine to the transmission control unit 40 at the same time. Accordingly, travel resistance is reduced since the engine 10 is mechanically separated from the transmission 12 and engine brake is not applied when the engine is stopped. In addition, the engine 10 is connected to the transmission 12 and power is normally transmitted after the engine is restarted.

Figure 5:
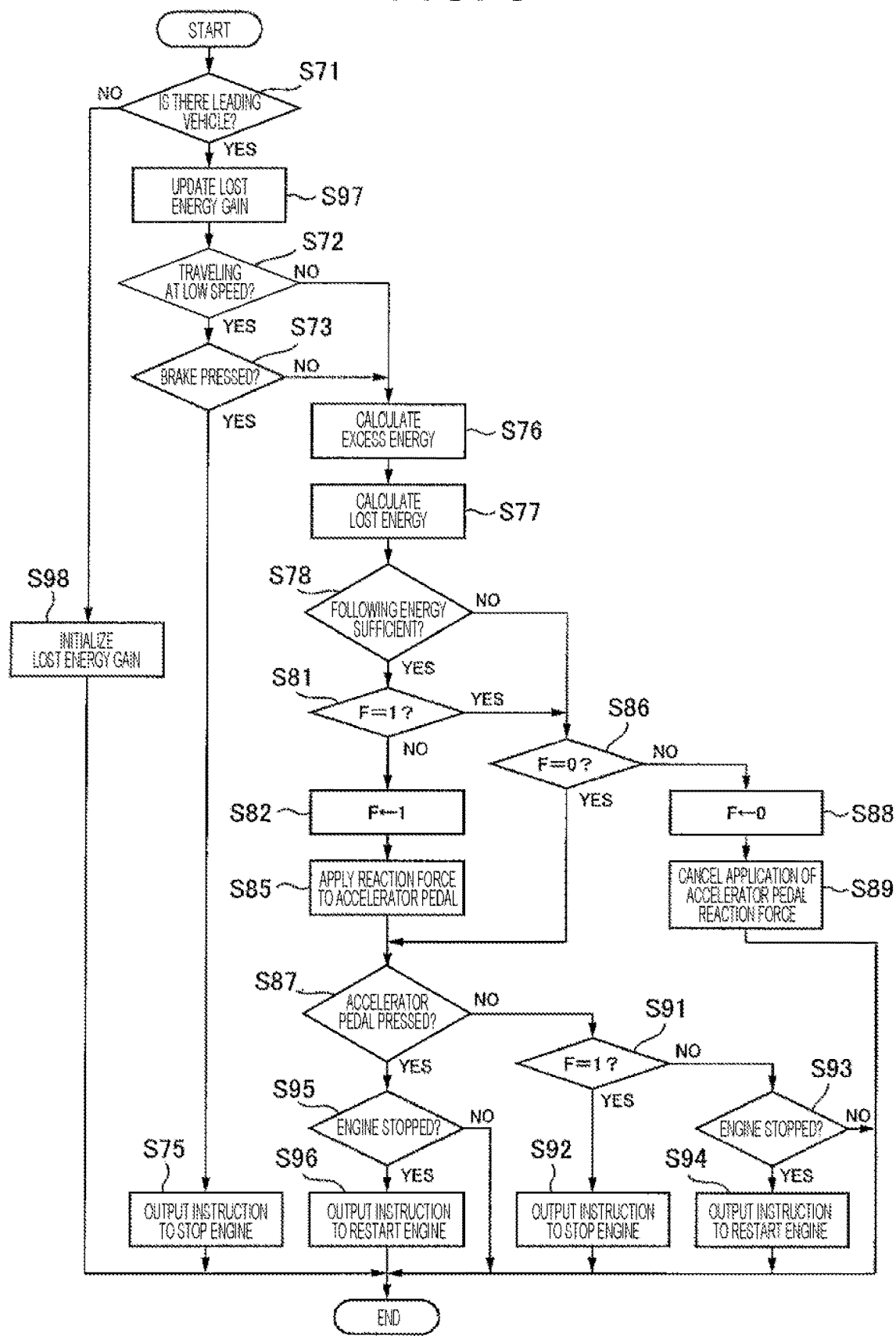
FIG. 5 is a flow chart showing an example of process of leading vehicle following traveling idle stop control routine performed by an overall vehicle control unit and procedure thereof.

Next, an example of process and procedure of idle stop control routine while traveling (while following the leading vehicle) performed by the overall vehicle control unit 20 will be described with reference to the flow chart of FIG. 5. This routine is repeatedly performed for each predetermined period (cycle).

First, in step S71 (hereinafter, "step" will be omitted), it is determined whether there is a leading vehicle in front of the host vehicle on the basis of the signal data from the stereo camera 17. Since idle stop control while traveling (while following the leading vehicle) is not performed when there is no leading vehicle, loss kinetic energy gain is initialized in S98 and this routine is completed with the gain α of the formulae (2) and (3) being "1."

The process proceeds to S97 when it is determined in S71 that there is a leading vehicle, and the gain α of the loss kinetic energy of the formulae (2) and (3) is updated to a predetermined value in S97. In S97, the width, the height, the vehicle type information, and the like of the leading vehicle obtained by the stereo camera 17 are supplied to the leading vehicle information determination unit 58, frequency of acceleration and deceleration of the leading vehicle within the predetermined period is obtained from the history of the vehicle speed of the leading vehicle, the obtained frequency and the result of determination of whether or not the predetermined frequency is exceeded within the predetermined time are supplied to the idle stop determination criteria updating unit 54, information of curve and relief of the road surface is supplied from the navigation device 23 to the idle stop determination criteria updating unit 54 via the road surface determination unit 59, rain condition is supplied from the wiper SW 22 of the wiper device to the idle stop determination criteria updating unit 54 via the road surface determination unit 59, information from the external communication device 60 is also supplied to the idle stop determination criteria updating unit 54, and the gain α of the loss kinetic energy is updated to a predetermined value in accordance with the leading vehicle information, the road condition, and the like. Specifically, the gain α is updated so that the gain α becomes more than 1 in order to prevent large loss kinetic energy of the host vehicle and prevent the engine stop time from being short when it rains or when the travel resistance is increased due to a curve of the road surface and an ascending slope. In addition, when it is determined that the leading vehicle is a large vehicle or when frequency of acceleration and deceleration of the leading vehicle is high, the gain α is updated so that the gain α becomes more than 1 in order to prevent the driver from feeling uncomfortable due to high frequency of engine stop and engine start.

In S72, it is determined whether or not the host vehicle is traveling at low speed. The process proceeds to S73 if the host vehicle is traveling at low speed and proceeds to S76 without proceeding to S73 if the host vehicle is not traveling at low speed, that is, if the host vehicle is traveling at high speed. In S72, whether or not the host vehicle is traveling at low speed is the first traveling idle stop condition.

In S73, it is determined whether or not the driver is pressing the brake pedal 27. The process proceeds to S75 if the driver is pressing the brake pedal 27 and an instruction to stop the engine is output to the engine control unit 30. As described, the engine 10 is stopped while the driver is pressing the brake pedal regardless of whether or not there is sufficient following kinetic energy. In contrast, the process proceeds to S76 if the driver is not pressing the brake pedal 27. In S73, whether or not the brake is pressed is the second traveling idle stop condition.

As described above, the reason for proceeding to S76 without proceeding to S73 when the host vehicle is traveling at high speed is as follows. That is, the engine cannot be stopped by brake pedal operation of the driver while the host vehicle is traveling at high speed. This is because the time required to restart the engine in high-speed area cannot sometimes be compensated by the shift time from the brake pedal operation to the accelerator pedal operation of the driver.

In S76, as described with reference to the excess kinetic energy calculation unit 51, excess kinetic energy, which is a difference between the kinetic energy of the host vehicle and the predicted kinetic energy of the host vehicle on the assumption that the host vehicle travels at the speed V of the leading vehicle, is calculated on the basis of the weight m of the host vehicle and the speed v of the host vehicle.

In following S77, as described with reference to the loss kinetic energy calculation unit 52, the loss kinetic energy of the host vehicle is calculated on the basis of the weight m of the host vehicle, the predicted deceleration speed A or the travel resistance of the host vehicle, the distance L to the leading vehicle, and the relative height h of the leading vehicle. This loss kinetic energy is corrected by the gain α updated in S97.

In following S78, as described with reference to the following determination unit 53, it is determined whether or not there is sufficient kinetic energy (kinetic energy for following) necessary for the host vehicle to follow the leading vehicle by inertia traveling on the basis of the excess kinetic energy and the loss kinetic energy corrected by the gain α. Here, it is determined there is sufficient kinetic energy for following if the excess kinetic energy is larger than the loss kinetic energy corrected by the gain α and the process proceeds to S81, and it is determined that kinetic energy for following is insufficient if the excess kinetic energy is smaller than the loss kinetic energy corrected by the gain α and the process proceeds to S86. In S78, whether or not there is sufficient kinetic energy for following is the third traveling idle stop condition.

In S81 to which the process proceeds when it is determined that there is sufficient kinetic energy for following, it is determined whether or not kinetic energy for following sufficient flag F is set (=1). If it is not F=1, F is set (1) in S82 and the process proceeds to S85.

In S85, since there is sufficient kinetic energy for following, the accelerator pedal reaction force-imparting actuator 26 is activated and an operational reaction force is applied to the accelerator pedal 24 in addition to an ordinary restoring force. As described above, this operation is performed for encouraging the driver to release the accelerator pedal 24 to inertially drive by applying a reaction force to the accelerator pedal 24.

On the other hand, in S86 to which the process proceeds when it is determined in S78 that the kinetic energy for following is insufficient, it is determined whether or not the kinetic energy for following sufficient flag F is reset (=0) and the process proceeds to S87 without proceeding to S85 (applying an operational reaction force to the accelerator pedal 24) if F=0.

In addition, the process proceeds to S86 also if it is determined in S81 that F=1, and if it is determined that it is not F=0, F is reset (0) in S88 and the process proceeds to S89 since the kinetic energy for following has been changed from sufficient state to insufficient state between the last time and this time.

In S89, application of the operational reaction force by the reaction force-imparting actuator 26 is canceled and this routine is completed since the kinetic energy for following is insufficient and it is not necessary to encourage the driver to release the accelerator pedal 24. In addition, when the accelerator pedal 24 is pressed more or pressed for the predetermined period or more even if the operational reaction force has been continuously applied in a routine other than this routine, the intention of the driver is respected and application of the operational reaction force by the reaction force-imparting actuator 26 is canceled. Note that, once application of the operational reaction force is canceled, the reaction force-imparting actuator 26 will not apply an operational reaction force until the next operation instruction (signal).

On the other hand, in S87 following S85, it is determined whether or not the accelerator pedal 24 is pressed, the process proceeds to S91 if it is not pressed, it is determined whether or not F=1, that is, whether or not there is sufficient kinetic energy for following, the process proceeds to S92 if there is sufficient kinetic energy for following, an instruction to stop the engine is output, and this routine is completed. The determination in S87 of whether or not the accelerator pedal is pressed is the fourth traveling idle stop condition.

In addition, if it is determined in S91 that the kinetic energy for following is insufficient (F=0), the process proceeds to S93, it is determined whether or not the engine is stopped, the process proceeds to S94 if the engine is stopped, an instruction to restart the engine is output, and this routine is completed. If the engine is not stopped, that is, if the engine is working (rotating), this routine is completed without any process (repeated output of an instruction to restart the engine is not necessary once an instruction to restart the engine is output).

In addition, if it is determined in S87 that the accelerator pedal 24 is pressed, it is determined in following S95 whether or not the engine is stopped, and an instruction to restart the engine is output in S96 and this routine is completed if the engine is stopped. If the engine is not stopped, that is, if the engine is working (rotating), this routine is completed without any process.

As described, in the vehicle control device according to the present embodiment, when there is a leading vehicle while traveling to follow the leading vehicle, a gain for calculating the loss kinetic energy of the host vehicle is updated on the basis of conditions such as characteristics of the leading vehicle, road surface condition, and weather in S97, the excess kinetic energy that is a difference between the kinetic energy of the host vehicle and the predicted kinetic energy of the host vehicle on the assumption that the host vehicle travels at the speed of the leading vehicle is calculated on the basis of the weight of the host vehicle and the speed of the host vehicle in S76, the loss kinetic energy of the host vehicle is calculated by the updated gain on the basis of the weight of the host vehicle, the speed of the host vehicle, the predicted deceleration speed or the travel resistance of the host vehicle, the distance to the leading vehicle, and the relative height of the leading vehicle in S77, and it is determined whether or not there is sufficient kinetic energy for following necessary for the host vehicle to follow the leading vehicle on the basis of the calculated excess kinetic energy and loss kinetic energy in S78. Then, a reaction force is applied to the accelerator pedal in S85 if there is sufficient kinetic energy for following, and the engine is stopped in S91 and S92 if the accelerator pedal is not pressed in S87.

Next, leading vehicle following traveling idle stop control according to the embodiment of the present invention will be described with reference to specific examples of travel patterns (FIGS. 6 to 10).

Figure 6:
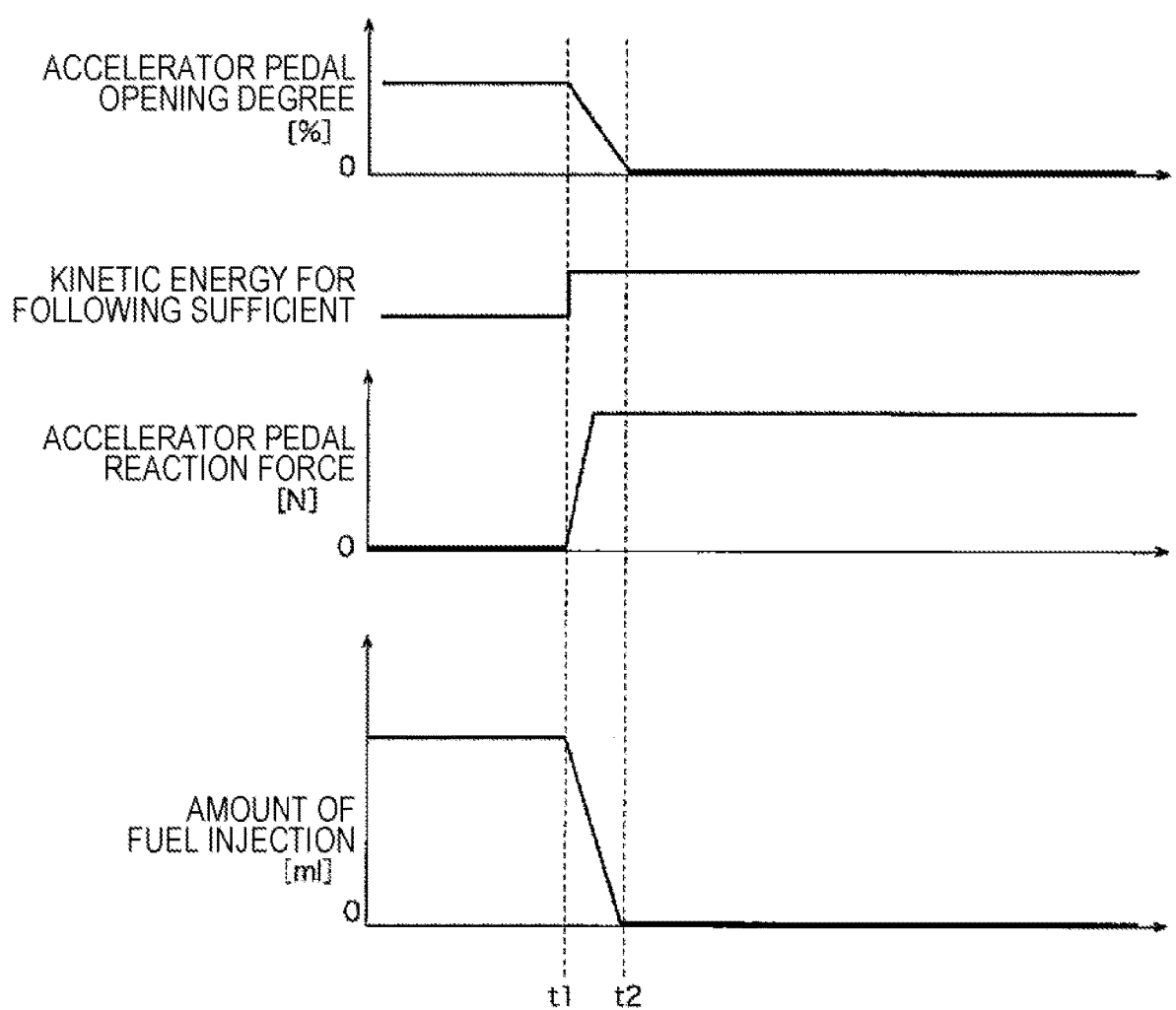
FIG. 6 is a time chart illustrating a travel pattern 1 of leading vehicle following traveling idle stop control according to an embodiment of the present invention.

In the travel pattern 1 illustrated in FIG. 6, although the host vehicle travels at the constant speed until the timing t1 and the speed of the leading vehicle is being reduced, the kinetic energy for following is insufficient. The kinetic energy for following becomes sufficient at the timing t1 and a reaction force is applied to the accelerator pedal 24. The driver releases the accelerator pedal 24 at the timing t2 in accordance with the reaction force of the accelerator pedal 24.

Accordingly, the traveling idle stop condition is satisfied, fuel injection or the like is stopped, and the engine is stopped. In such a travel pattern, since it is difficult for the driver to recognize that the speed is excessively increasing in the known traveling idle stop control, it is highly possible that the driver keeps pressing the accelerator pedal 24 even after the timing t1 and fuel economy is sometimes degraded. In addition, in the known traveling idle stop control, even after the timing t2 at which the accelerator pedal 24 is released, fuel economy is worse since an idle state is maintained until the brake pedal 27 is pressed (fuel economy becomes worse as the time until the brake pedal 27 is pressed becomes longer).

Figure 7:
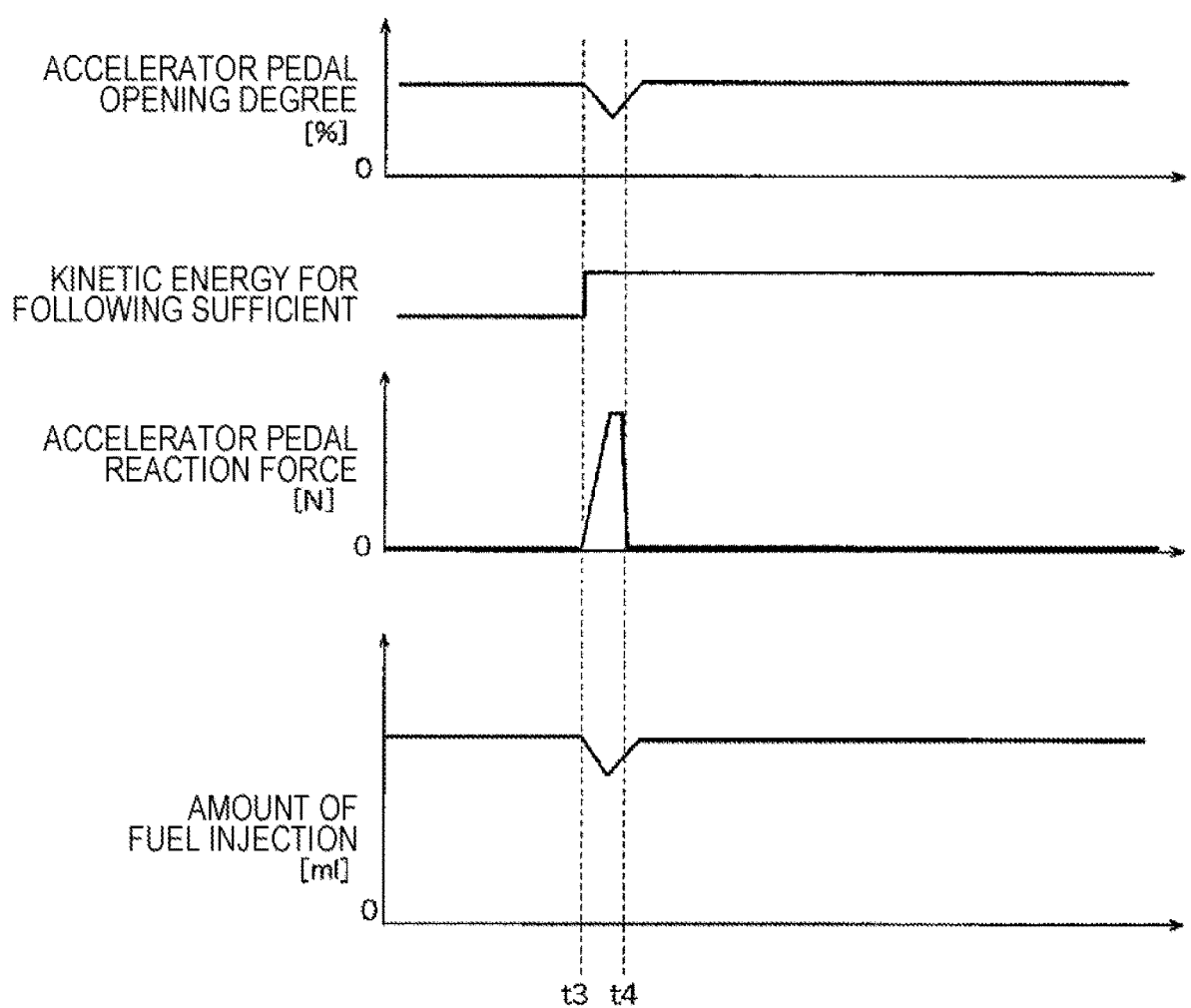
FIG. 7 is a time chart illustrating a travel pattern 2 of leading vehicle following travelling idle stop control according to an embodiment of the present invention.

In the travel pattern 2 illustrated in FIG. 7, the host vehicle travels at the constant speed until the timing t3 and the speed of the leading vehicle is being reduced, but the kinetic energy for following is insufficient. Although the kinetic energy for following becomes sufficient and a reaction force is applied to the accelerator pedal 24 at the timing t3, the driver presses the accelerator pedal 24 more resisting the reaction force in order to pass the leading vehicle.

In this case, the intention of the driver is prioritized and the engine is not stopped even if there is sufficient kinetic energy for following. In such travel pattern 2, although there is little difference from the known traveling idle stop control in terms of fuel economy, it is different from the known traveling idle stop control in that the intention of the driver is confirmed. Note that, as described above, since the driver presses the accelerator pedal 24 more resisting the reaction force, the intention of the driver is respected immediately thereafter and application of the operational reaction force by the reaction force-imparting actuator 26 is canceled.

Figure 8:
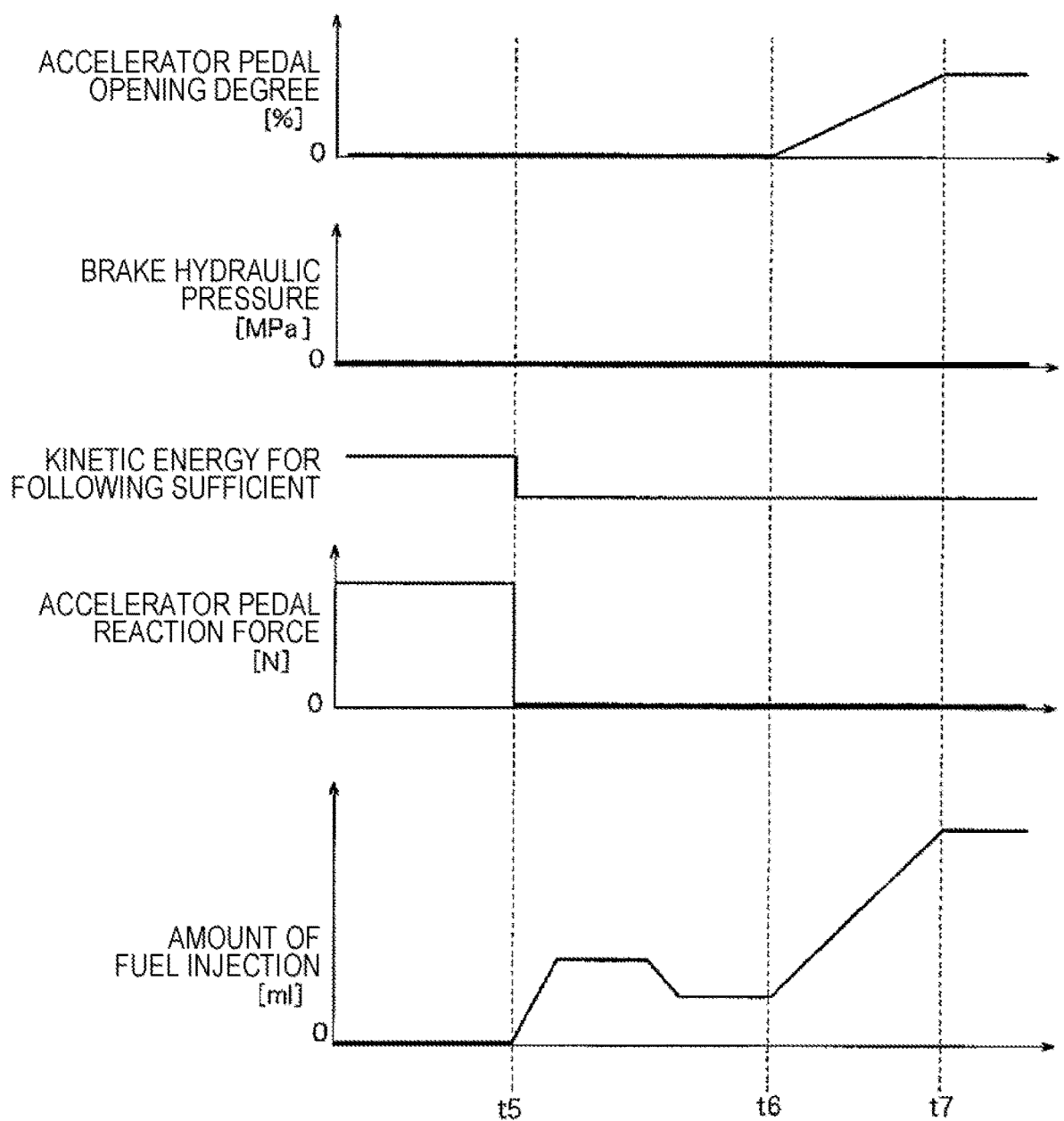
FIG. 8 is a time chart illustrating a travel pattern 3 of leading vehicle following travelling idle stop control according to an embodiment of the present invention.

In the travel pattern 3 illustrated in FIG. 8, although the speed of the leading vehicle is increased until the timing t5, the host vehicle inertially approaches the leading vehicle as the speed of the host vehicle is high and the engine is stopped as there is sufficient kinetic energy for following. After the timing t5, the engine is restarted as the kinetic energy for following becomes insufficient and after the timing t6, the driver starts to press the accelerator pedal 24 and the speed of the host vehicle is increased in order to follow the leading vehicle.

In such travel pattern 3, although it is an idle state as the brake pedal 27 is not pressed until the timing t5 and fuel economy is degraded in the known traveling idle stop control, it is improved in the embodiment of the present invention.

Figure 9:
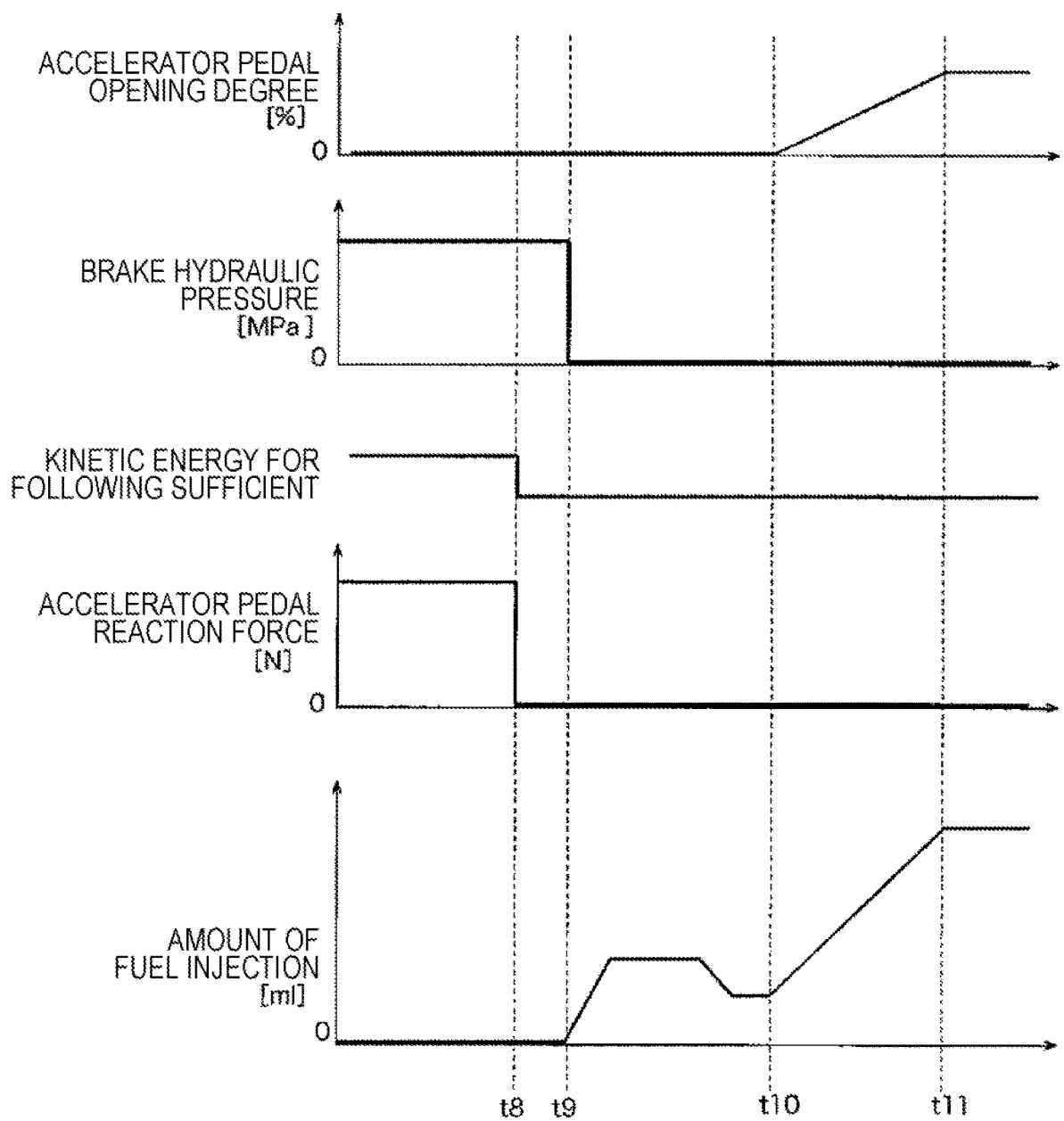
FIG. 9 is a time chart illustrating a travel pattern 4 of leading vehicle following travelling idle stop control according to an embodiment of the present invention.

In the travel pattern 4 illustrated in FIG. 9, although the host vehicle is traveling at the low speed and the speed of the leading vehicle is increased until the timing t8, the host vehicle is approaching the leading vehicle by brake deceleration as the speed of the host vehicle is high and the engine is stopped as there is sufficient kinetic energy for following.

Although the kinetic energy for following is insufficient after the timing t8, the engine is kept stopped until the timing t9 as the driver maintains brake deceleration. The engine is restarted in the timing t9 as the driver releases the brake and the driver starts to press the accelerator pedal 24 and increases the speed in order to follow the leading vehicle at the timing t10. In such travel pattern 4, since it is the same as the known traveling idle stop control, fuel economy is not degraded more than the known traveling idle stop control.

Figure 10:
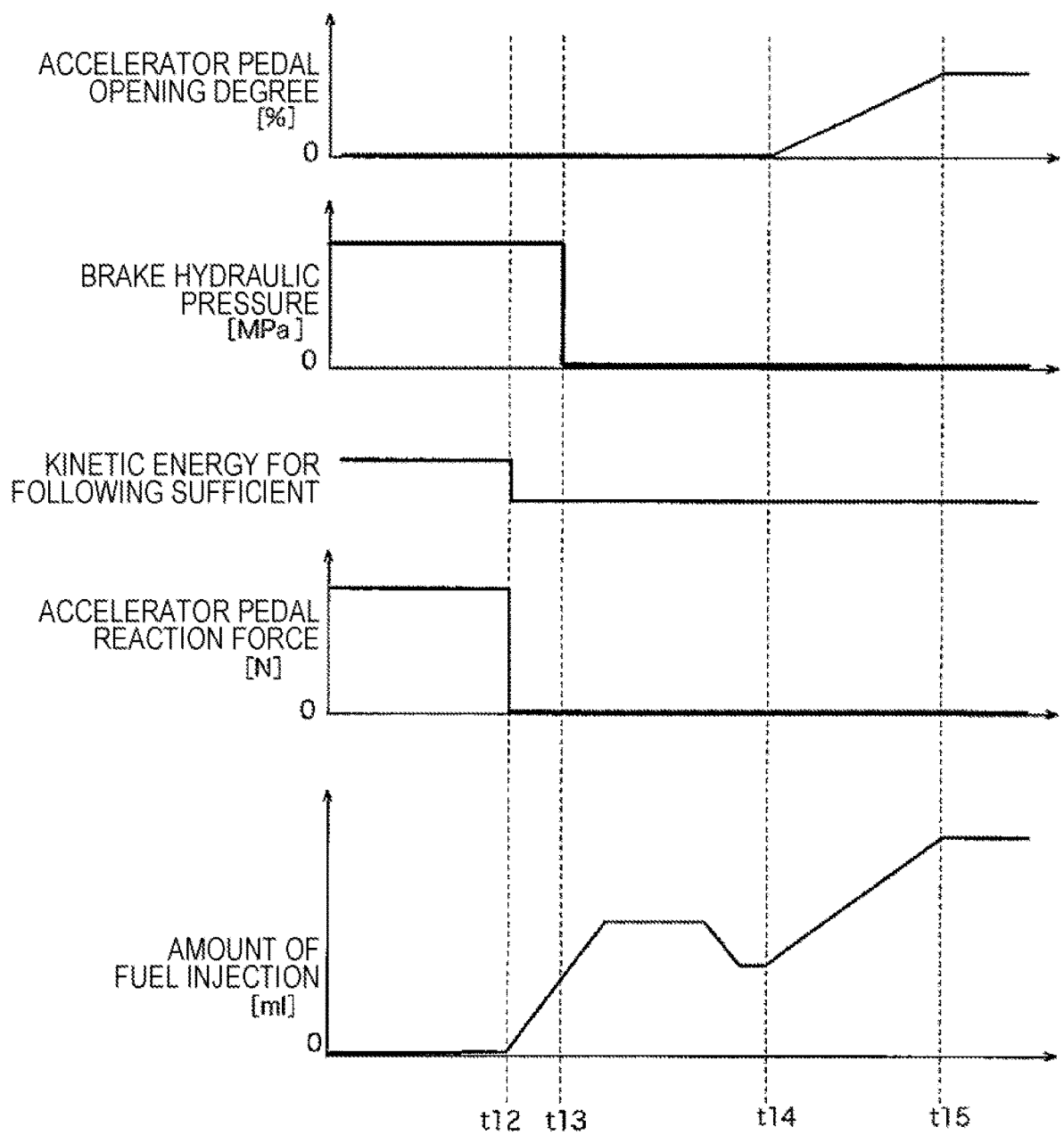
FIG. 10 is a time chart illustrating a travel pattern 5 of leading vehicle following travelling idle stop control according to an embodiment of the present invention.

In the travel pattern 5 illustrated in FIG. 10, although the host vehicle is traveling at the high speed and the speed of the leading vehicle is increased until the timing t12, the host vehicle is approaching the leading vehicle by brake deceleration as the speed of the host vehicle is high and the engine is stopped as there is sufficient kinetic energy for following.

After the timing t12, since the kinetic energy for following is insufficient, the engine is restarted regardless of brake pedal operation (brake releasing operation at the timing t13 has nothing to do with this control).

At the timing t14, the driver starts to press the accelerator pedal 24 and increases the speed in order to follow the leading vehicle.

In such travel pattern 5, the engine cannot be stopped until the timing t12 in the known traveling idle stop control as described above. Therefore, fuel economy is degraded but since the engine can be stopped even while traveling at the high speed in the embodiment of the present invention, fuel economy can be improved.

As described, in the vehicle control device 5 according to the embodiment of the present invention, even if the driver releases the brake pedal 27 during traveling idle stop (while the engine is stopped), the engine can be kept stopped if there is sufficient kinetic energy for following for the host vehicle to follow the leading vehicle by inertia traveling.

In addition, since the engine is restarted when the kinetic energy for following becomes insufficient while the engine is stopped, the engine can be restarted before the driver starts to press the accelerator pedal 24, and the driver does not recognize delay in acceleration of engine start.

Moreover, since the engine can be restarted before the driver starts to press the accelerator pedal 24 as described above, the engine can be stopped even while traveling at the high speed in which delay time required to start the engine becomes too long to be compensated by the shift time from the brake pedal operation to the accelerator pedal operation of the driver.

In addition, since the reaction force-imparting actuator 26 is activated to apply an operational reaction force to the accelerator pedal 24 when there is sufficient kinetic energy for following, it is possible to encourage the driver to release the accelerator pedal 24 to inertially drive and therefore, it is possible to prevent the driver from excessively performing acceleration operation.

In addition, when the accelerator pedal 24 is pressed more or pressed for the predetermined period or more even though the operational reaction force is kept applied, the intention of the driver is prioritized and application of the operational reaction force by the reaction force-imparting actuator 26 will be canceled.

Therefore, in the vehicle 1 including the vehicle control device 5 according to the present embodiment, it is possible to reduce energy consumption as much as possible without decreasing operability of the vehicle while following a leading vehicle. As a result, it is possible to effectively improve fuel economy and reduce exhaust gas without causing the driver to feel uncomfortability.

As described, in the vehicle control device according to the present embodiment, since the determination condition of the following determination unit that determines whether or not to perform traveling idle stop is updated by conditions such as characteristics of the leading vehicle, road surface condition, and weather, it is possible to control traveling idle stop in accordance with the leading vehicle and it is possible to effectively improve fuel economy and reduce exhaust gas without causing the driver to feel uncomfortability.

While the embodiment of the present invention has been described above with reference to the drawings, the specific configuration is not limited to this embodiment, and any modifications within the spirit of the present invention shall be included in the present invention.

For example, while a case in which the present invention is applied to a gasoline engine vehicle has been described in the above embodiment, the present invention is not limited thereto and the present invention can be similarly applied to a diesel engine vehicle, a hybrid vehicle, and the like.

In addition, a part of a configuration of an embodiment may be substituted by a configuration of another embodiment, and a configuration of another embodiment may be added to a configuration of an embodiment. In addition, with respect to a part of a configuration of each embodiment, another configuration may be added and deleted and may replace such a part.

REFERENCE SIGNS LIST

1 vehicle (host vehicle)
5 vehicle control device
10 engine (in-vehicle engine)
12 transmission 17 stereo camera
20 overall vehicle control unit
21 vehicle speed sensor
22 wiper SW
23 navigation device
24 accelerator pedal
25 accelerator pedal opening degree sensor
26 reaction force-imparting actuator
27 brake pedal
28 brake sensor
30 engine control unit
31 fuel injection valve
33 ignition unit
34 electrically controlled throttle valve
40 transmission control unit
51 excess kinetic energy calculation unit
52 loss kinetic energy calculation unit
53 unit for determining whether kinetic energy for following exists (following determination unit)
54 idle stop determination criteria updating unit (determination condition update unit)
55 idle stop determination unit
58 leading vehicle information determination unit
59 road surface determination unit
60 external communication device

The invention claimed is:

1. A vehicle control system comprising:
   a vehicle control device that performs a traveling idle stop that temporarily stop an in-vehicle engine when a driving/travel state of a host vehicle satisfies a first traveling idle stop condition while the host vehicle follows a leading vehicle, wherein the vehicle control device includes
   a following determination unit that determines whether or not the host vehicle is able to follow the leading vehicle by inertia traveling, during which the in-vehicle engine is stopped, based on a speed of the host vehicle, a speed of the leading vehicle, and a distance between the host vehicle and the leading vehicle;
   an idle stop determination unit that determines whether or not to perform the traveling idle stop if the driving/travel state of the host vehicle satisfies a second traveling idle stop condition and the following determination unit determines that the host vehicle is able to follow the leading vehicle by the inertia traveling;
   a determination condition update unit that updates a determination condition of the idle stop determination unit based on a characteristic of the leading vehicle, road surface condition, and weather,
   an excess kinetic energy calculating unit that calculates a difference between kinetic energy of the host vehicle and a predicted kinetic energy of the host vehicle, the excess kinetic energy calculating unit assuming that the host vehicle travels at the speed of the leading vehicle, and the excess kinetic energy calculating unit performing the calculation based on the weight of the host vehicle and the speed of the host vehicle; and
   a loss kinetic energy calculating unit that calculates a loss of kinetic energy of the host vehicle based on the weight of the host vehicle, the speed of the host vehicle, a predicted deceleration speed or travel resistance of the host vehicle, the distance between the host vehicle and the leading vehicle, and relative height of the leading vehicle, wherein
   the following determination unit determines whether or not there is sufficient kinetic energy for the host vehicle to follow the leading vehicle with inertia traveling on the basis of the calculated excess kinetic energy and the loss kinetic energy corrected by a gain updated by the determination condition update unit with the condition including the characteristic of the leading vehicle, the road surface condition, and the weather.

2. The vehicle control system according to claim 1, wherein the determination condition update unit is a unit for determining whether kinetic energy for following exists for detecting frequency of acceleration/deceleration speed of the leading vehicle on the basis of history of the speed of the leading vehicle and updating the determination condition when the frequency of the acceleration/deceleration speed exceeds a predetermined threshold value.

3. The vehicle control system according to claim 1, wherein the determination condition update unit detects a vehicle type of the leading vehicle and updates the determination condition if the vehicle type matches a registered one.

4. The vehicle control system according to claim 3, wherein the idle stop determination unit restarts the in-vehicle engine if the following determination unit determines that the kinetic energy for following is insufficient while the in-vehicle engine is stopped.

5. The vehicle control system according to claim 1, wherein the idle stop determination unit restarts the in-vehicle engine if pressing of an accelerator pedal is detected while the in-vehicle engine is stopped.

6. The vehicle control system according to claim 1, wherein the idle stop determination unit restarts the in-vehicle engine if pressing of an accelerator pedal is detected while the in-vehicle engine is stopped.

7. The vehicle control system according to claim 6, wherein the idle stop determination unit applies an operational reaction force to the accelerator pedal in addition to an ordinary restoring force if the following determination unit determines that there is sufficient kinetic energy for following, and cancels application of the operational reaction force if the following determination unit determines that the kinetic energy for following is insufficient and if the accelerator pedal is pressed more or pressed for a predetermined period or more even though the operational reaction force is kept applied.

8. The vehicle control system according to claim 1, wherein the idle stop determination unit stops the in-vehicle engine regardless of whether or not detection of the kinetic energy for following by the following determination unit is sufficient while pressing of a brake pedal is being detected when traveling at low speed.

9. The vehicle control system according to claim 1, wherein the idle stop determination unit stops the in-vehicle engine as long as another traveling idle stop condition is satisfied regardless of brake pedal operation if the following determination unit determines that there is sufficient kinetic energy for following when traveling at high speed.

10. A vehicle control method comprising:
    performing a traveling idle stop, using a vehicle control device that temporarily stops an in-vehicle engine when a driving/travel state of a host vehicle satisfies a first traveling idle stop condition while the host vehicle follows a leading vehicle;
    determining whether or not the host vehicle is able to follow the leading vehicle by inertia traveling, during which the in-vehicle engine is stopped, using a following determination unit which bases the determining step on a speed of the host vehicle, a speed of the leading vehicle, and a distance between the host vehicle and the leading vehicle;

determining whether or not to perform the traveling idle stop, using an idle stop determination unit, if the driving/travel state of the host vehicle satisfies a second traveling idle stop condition and the following determination unit determines that the host vehicle is able to follow the leading vehicle by the inertia traveling;

updating a determination condition of the idle stop determination unit, using a determination condition update unit, based on a characteristic of the leading vehicle, road surface condition, and weather;

calculating a difference between kinetic energy of the host vehicle and a predicted kinetic energy of the host vehicle, using an excess kinetic energy calculating unit, the excess kinetic energy calculating unit assuming that the host vehicle travels at the speed of the leading vehicle, and the excess kinetic energy calculating unit performing the calculation based on the weight of the host vehicle and the speed of the host vehicle; and calculating a loss of kinetic energy of the host vehicle, using a loss kinetic energy calculating unit, based on the weight of the host vehicle, the speed of the host vehicle, a predicted deceleration speed or travel resistance of the host vehicle, the distance between the host vehicle and the leading vehicle, and relative height of the leading vehicle, wherein the following determination unit determines whether or not there is sufficient kinetic energy for the host vehicle to follow the leading vehicle with inertia traveling on the basis of the calculated excess kinetic energy and the loss kinetic energy corrected by a gain updated by the determination condition update unit with the condition including the characteristic of the leading vehicle, the road surface condition, and the weather.

\* \* \* \* \*